United States Patent [19]

Distaso

[11] Patent Number: 5,726,140
[45] Date of Patent: Mar. 10, 1998

[54] WATER-IN-OIL EMULSION HAVING AQUEOUS PHASE EVAPORATION RETARDED WITH WAX

[75] Inventor: John Distaso, Bensalem, Pa.

[73] Assignee: Elf Atochem North America, Inc., Philadelphia, Pa.

[21] Appl. No.: 706,850

[22] Filed: Sep. 3, 1996

Related U.S. Application Data

[63] Continuation of Ser. No. 286,021, Aug. 4, 1994, abandoned, which is a continuation-in-part of Ser. No. 111,812, Aug. 25, 1993, Pat. No. 5,387,363, which is a continuation of Ser. No. 892,458, Jun. 2, 1992, abandoned.

[51] Int. Cl.$^6$ .............................. C09D 9/02; B05D 3/02; B05D 3/04; B32B 17/08
[52] U.S. Cl. .............................. 510/207; 524/19; 524/31; 524/43; 427/302; 427/303; 427/334; 427/335; 428/424.6; 428/438; 428/439; 428/467
[58] Field of Search .............................. 524/19, 31, 43; 427/302, 303, 334, 335; 428/424.6, 438, 439, 467; 510/207

[56] References Cited

U.S. PATENT DOCUMENTS

| | | | |
|---|---|---|---|
| 1,169,783 | 2/1916 | Ellis | 252/171 |
| 1,675,227 | 6/1928 | Reeve | 252/171 |
| 2,737,465 | 3/1956 | Pfessel | 134/38 |
| 3,356,614 | 12/1967 | Gilbert | 252/171 |
| 3,391,085 | 7/1968 | Crockett | 252/143 |
| 3,702,304 | 11/1972 | Esposito | 251/171 |
| 3,979,219 | 9/1976 | Chang et al. | 106/271 |
| 3,983,047 | 9/1976 | Vinson | 252/119 |
| 4,254,104 | 3/1981 | Suzuki | 424/170 |
| 4,269,724 | 5/1981 | Hodson | 252/171 |
| 4,445,939 | 5/1984 | Hodson | 134/2 |
| 4,732,695 | 3/1988 | Francisco | 252/162 |
| 4,780,235 | 10/1988 | Jackson | 252/170 |
| 5,011,621 | 4/1991 | Sullivan | 252/162 |
| 5,015,410 | 5/1991 | Sullvian | 252/166 |
| 5,188,666 | 2/1993 | Boccardo | 106/190 |
| 5,310,496 | 5/1994 | Taylor | 252/171 |
| 5,387,363 | 2/1995 | Distaso | 252/163 |
| 5,405,548 | 4/1995 | Distaso | 252/170 |
| 5,411,678 | 5/1995 | Sim | 252/548 |
| 5,454,985 | 10/1995 | Harbin | 252/558 |
| 5,478,491 | 12/1995 | Jarena | 252/171 |
| 5,569,410 | 10/1996 | Distaso | 510/202 |
| 5,605,579 | 2/1997 | Distaso | 134/38 |

FOREIGN PATENT DOCUMENTS

| | | |
|---|---|---|
| 0 160 762 | 11/1985 | European Pat. Off. . |
| 3438399 | 4/1986 | Germany . |
| 3913911 | 11/1990 | Germany . |
| 60-124661 | 7/1985 | Japan . |
| 16060 | 8/1903 | United Kingdom . |

OTHER PUBLICATIONS

Ullmannus Enzyklopadie 1974 Germany p. 371.
Gibson–formic Acid 1969 US 673–691.
Kailan & Adler 1933 Germany 155–185.
Werner 1980 Germany p. 196.

*Primary Examiner*—Mukund J. Shah
*Assistant Examiner*—Tamthom T. Ngo
*Attorney, Agent, or Firm*—William D. Mitchell; Stanley A. Marcus

[57] ABSTRACT

Natural or synthetic wax dissolved in the continuous organic phase of an water-in-oil emulsion retards evaporation of water from a dispersed aqueous phase. An in situ prepared equilibrium mixture of benzyl alcohol, formic acid and benzyl formate emulsified with oleic hydroxyethyl imidazoline or similar oil soluble emulsifying agent is thickened with hydroxypropyl cellulose or hydroxypropyl methylcellulose and contains 0.1 to 1.0% by weight paraffin wax with a melting point of 47° to 65° C. Wax dissolved in the organic phase retards evaporation of water, and formic acid or ammonia which are very volatile in comparison with benzyl alcohol forming the major component of the organic phase. A petroleum distillate is used to pre-wet a hydroxypropyl cellulose thickener and dissolve the wax.

4 Claims, No Drawings

WATER-IN-OIL EMULSION HAVING AQUEOUS PHASE EVAPORATION RETARDED WITH WAX

CROSS-REFERENCE TO RELATED APPLICATIONS

This is a continuation of application Ser. No. 08/286,021 filed Aug. 4, 1994, now abandoned, which in turn is a continuation-in-part of application Ser. No. 08/111,812 filed Aug. 25, 1993. (now U.S. Pat. No. 5,387,363), which in turn is a continuation of application Ser. No. 07/892,458 filed Jun. 2, 1992 (now abandoned).

FIELD OF THE INVENTION

The present invention relates to water-in-oil emulsions having reduced rates of evaporation, especially to methods for the reduction of water evaporation therefrom by the inclusion of paraffin wax in the water-in-oil emulsion and to compositions such as paint strippers containing such emulsions.

BACKGROUND OF THE INVENTION

It has been known since U.S. Pat. No. 1,169,783 issued in 1916 to Ellis that paraffin wax was a useful component for paint stripper formulations which contained volatile chlorinated solvents and ethyl and benzyl alcohols. Within these nonaqueous systems dissolved paraffin wax separates out as a surface layer when the composition is cooled by the evaporation of a volatile organic component such as methylene chloride. Users of commercial paint stripper formulations observe the liquid surface inside the can "wax over" right before their eyes as soon as the cap is removed from the can. U.S. Pat. No. 4,445,939 teaches an improved vapor suppressant paint stripper using a combination of paraffin wax and surfactant for a methylene chloride and liquid alcohol solvent system.

Water soluble paint remover compositions are known from U.S. Pat. No. 4,812,255 wherein toxic organic soluble ingredients are avoided by combining: (a) a water soluble acid such as formic acid or acetic acid (b) an alkylene glycol ether, and (c) a lactam such as n-methyl-2-pyrrolidone. In addition to surfactants and corrosion inhibitors, these formulations employ thickeners and gelling agents to limit evaporation of volatile organic solvents into the atmosphere. A particularly useful thickening and gelling agent was a form of hydroxypropyl cellulose having solubility in both organic and aqueous phases within the formulation.

U.S. Pat. No. 4,445,939 teaches a paint stripping and conditioning solution comprising (1) a chlorinated solvent and a liquid alcohol (2) a wetting agent, and (3) a vapor suppressant. The liquid alcohol can be benzyl alcohol and the vapor suppressant paraffin wax, but water in the formulation should vary from 0.5 to 5% and preferably 0.5 to 3% by weight.

U.S. Pat. No. 5,015,410 teaches a paint stripper and coatings remover free of methylene chloride containing n-methyl pyrrolidone, an aliphatic hydrocarbon such as mineral spirits, a miscibilizing solvent such as aromatic naphtha and a accelerator such as formic or acetic acid to promote removal of resistant coatings. The same thickening and gelling agents were employed as in the '255 patent including in particular hydroxypropyl cellulose and its chemical equivalent hydroxypropyl methylcellulose.

German publication DE 34 38 399 teaches a paint stripping formulation containing a thickener, a soap and a butyl ester of succinic acid. Evaporation retarding materials such as paraffin wax display the negative effect on adhesion of new paint by residues which remain in the substrate.

Yet in spite of what was known for paint stripper and coatings remover compositions and methods of use, it was nowhere suggested of any possible benefit for the invention disclosed in commonly owned, copending application Ser. No. 777,865, filed Oct. 6, 1991 (the parent of U.S. Pat. No. 5,405,548), the entire specification of which is incorporated herein by reference. This application describes an in situ produced equilibrium mixture of benzyl (or methyl benzyl) formate ester, benzyl (or methylbenzyl) alcohol, formic acid and water having unexpected and superior paint stripping or paint removing properties.

SUMMARY OF THE INVENTION

An object of the invention is to provide an improved water-in-oil emulsion wherein water and water soluble components have a reduced evaporation rate provided by a natural or synthetic wax incorporated in an organic phase. A preferred object is to provide an equilibrium mixture paint stripper or coatings remover wherein paraffin wax is incorporated in a benzyl alcohol phase.

The wax containing water-in-oil emulsions of the invention display unique chemical properties in terms of improved stripping action and superior physical behavior such as flow and rinse. Loss of water from either acid or ammoniacal water-in-oil formulations results in a decrease in stripping action. Natural or synthetic wax or mineral or paraffin oil retard evaporation of water and ammonia or formic acid from an aqueous phase rather than an organic solvent from an organic phase. It was not previously known to be important to prevent the evaporation of inorganic materials such as water, since water loss was not believed to be detrimental.

DETAILED DESCRIPTION OF THE INVENTION

This invention has many possible applications where water-in-oil emulsions can be used since it reduces odors of the formulations and improves their use life, emulsion stability, and freeze-thaw stability, such as in paint strippers, cleaners, perfume concentrates, paste waxes, and the like. It is particularly advantageous in paint removers since the inclusion of paraffin wax can also improve the stripping efficiency by retarding evaporation of ingredients such as water and other volatiles that enhance stripping, improve flow characteristics and cling of the stripper to vertical surfaces, permit the use of less stripper, and, because it does not dry out, improve water rinsing.

By incorporating a small percentage of an evaporation retardant such as natural or synthetic wax into the organic (oleaginous) phase of a mixed phase emulsion such as a paint stripper or coating remover the evaporation rate of water and water soluble components can be reduced by greater than 90%. Thus a paint stripper water-in-oil emulsion containing paraffin wax would lose only about one gram of water during the time that a control without the paraffin wax or other evaporation retardant would lose about ten or more grams of water due to evaporation. This is particularly useful in equilibrium mixture water-in-oil emulsion formulations in which water functions to increase the stripping rate rather than act as a diluent. A preferred wax is paraffin wax (which term includes its individual components) which can first be melted or dissolved before being added into an organic phase. Paraffin or mineral oil, vegetable wax, microcrystalline wax, ceresine wax and montan wax may similarly be added to retard evaporation of water from a water-in-oil emulsion. It is also possible to add behenic acid or polymeric materials such as polyacrylate or vinyl chloride acrylic ester copolymers as evaporation retardants.

This retardation of evaporation can be achieved by dissolving or blending the wax or other evaporation retardant into the continuous, organic phase of the mixed phase emulsion. The wax in the organic phase is soluble, but preferably minimally soluble. As such the mount of wax present is slightly in excess (1% by weight) of that would saturate the organic phase; and, so as to reduce flammability, the bulk of this organic phase is less volatile than water. This is a special case, previously unknown, in which an inorganic material such as water is more volatile than an organic solvent in the paint stripper formulation such as benzyl alcohol.

There are many materials (or combinations thereof) which may serve as the organic phase of the mixed phase water-in-oil emulsion, depending on the end use, such as hydrocarbons (including petroleum distillates, both aromatic and aliphatic), alcohols, ketones, ethers, esters, and amines. For an alkaline paint stripper a preferred material as the major component of the organic phase is benzyl alcohol. For an acid paint stripper a most preferred organic phase comprises benzyl formate neat or produced in situ from benzyl alcohol and formic acid.

The amount of natural or synthetic wax incorporated in the emulsion within the organic phase is normally from about 0.02 to 5.0 percent by weight, based on the total weight of the emulsion, more typically from about 0.1 to 1.0%. Any type of commercially available paraffin wax or ceresine wax (or their components) can be used. Most paraffin waxes have a melting point in the range of about 47° to 65° C.

Aforementioned application Ser. No. 07/777,865 describes a formulation containing a water-in-oil emulsion where the "oil" phase is a mixture of organic solvents comprised of a benzyl (or methylbenzyl) ester, and, preferably, a benzyl (or methylbenzyl) alcohol and formic acid. The ester is perferably formed in situ by reaction of the alcohol and acid. Equilibrium concentrations of benzyl formate, benzyl alcohol and formic acid are reached within 24 hours in the continuous organic phase of an in situ produced water-in-oil emulsion.

It has been discovered that in contrast to coating removing or paint stripping formulations known from the prior art, a natural or synthetic wax can function to retard the evaporation of water (as well as either ammonia or formic acid) rather than benzyl alcohol. It was unexpected that paraffin wax, which was known to prevent evaporation from an organic phase, would function to prevent water and formic acid and ammonia from evaporating from an aqueous phase. Both the chemical and physical similarities and differences were in no way predictable from prior art dating back to 1903.

While a person of ordinary skill in the art would learn from U.S. Pat. No. 4,445,939 that the presence of more than about 5% by weight water provides no further advantage for a paint stripper containing benzyl alcohol, the opposite has been discovered in the present invention. Whereas in the formulations of the prior art any water in excess of about 3 to 5 % by weight served merely as a diluent, it has now been discovered that with ester/alcohol/acid equilibrium mixtures the stripping rate will decrease if evaporation reduces the water content below about 5% by weight. It was indeed unexpected and surprising to have discovered directly opposite performance, i.e., in the prior art case adding water decreases solvent activity whereas in the present invention adding water increases solvent activity. Further DE 3438399 disclosed that paraffin wax as an evaporation retardant is not required when volatile solvents were eliminated from the paint stripper formulation.

Useful additions for these water-in-oil emulsion paint stripper or coating removing formulations include, but are not limited to, oleic hydroxyethyl imidazole, sodium hydroxide, sodium silicate, 2-mercaptobenzothiazole, hydroxypropyl cellulose, hydroxypropyl methylcellulose, xanthan gum, toluene triazole, sodium polymethacrylate, mineral or paraffin oil, propylene glycol, ethoxylated nonylphenol and sodium xylene sulfonate surfactants.

While the invention has particular industrial applicability to paint stripping and coating removal of epoxy and polyurethane, it is not limited thereto and may be employed in a general sense to mixed phase emulsions wherein it is desirable to prevent evaporation of water and water soluble ingredients from an aqueous phase. It was indeed an unexpected and surprising result to discover that the water-in-oil emulsions of the invention displayed such unique chemical properties and physical properties.

The following procedures and examples, which are not intended to be limiting, illustrate the practice of the invention.

PROCEDURE A

PROCESS FOR PREPARING ALKALINE PAINT STRIPPER BATCH

Paint stripper batches were prepared by combining three premix batches and topping off with water. While it was possible to prepare formulations by simply mixing together all ingredients, longer mixing times and higher shear mixing was required.

First premix

As a minimum an amphoteric emulsifier and benzyl alcohol are combined. In addition to at least emulsifier and benzyl alcohol a portion of hydrocarbon solvent consisting of aromatic petroleum distillate was used to pre-wet the hydroxypropyl cellulose or hydroxypropyl methylcellulose to prevent lumping. With larger mixing times or more active stirring the pre-wet step is not needed. The emulsifying agent, corrosion inhibitor(s) and other oil soluble ingredients for the first premix, which serves as the continuous organic phase, may be incorporated at this point.

Second Premix

This aqueous phase contains water and ammonia or monoethyanolamine or other alkaline additive. This aqueous phase is mixed with the organic phase in the presence of an emulsifying agent such as oleic hydroxyethyl imidazoline to produce the water-in-oil emulsion. In the emulsification process the first premix and the second premix combine to produce a dispersed aqueous phase in a continuous organic (oleaginous) phase.

Third Premix

A portion of petroleum distillate was used to pre-dissolve the paraffin wax. Upon adding this third premix to the mixed phase emulsion the organic phases are combined and remain separate from the aqueous phase in the form of a water-in-oil emulsion. As an alternative to adding the wax as a solution, melted wax can be added directly to the first premix with heating and mixing, thereby eliminating the need for this petroleum distillate.

PROCEDURE B

PROCESS FOR PREPARING ACID PAINT STRIPPER BATCH

Paint stripper batches were prepared by combining three premix batches and topping off with water. While it was possible to prepare formulations by simply mixing all ingredients, longer mixing times and higher shear mixing was required.

First Premix

Formic acid and an excess of benzyl alcohol were combined with hydroxypropyl methylcellulose or hydroxypropyl cellulose prewetted with a portion of aromatic petroleum distillate and oleic hydroxyethyl imidazoline or other suitable amphoteric emulsifying agent. In addition to thickener and emulsifying agent, other ingredients such as corrosion inhibitors served to make up what would become the organic (oleaginous) continuous phase. After about 24 hours at ambient conditions benzyl formate ester was produced by an uncatalyzed esterification of the benzyl alcohol and formic acid and approximately 1.3% or more water was produced as a byproduct.

Second Premix

This aqueous phase may be water or may contain sodium hydroxide to partially neutralize formic acid and produce sodium formate. When added the sodium hydroxide is less than the amount which will neutralize all unreacted formic acid. This aqueous phase is mixed with the organic phase in the presence of emulsifying agent to produce the water-in-oil emulsion.

Third Premix

A portion of aromatic petroleum distillate was used to dissolve the paraffin wax. Upon adding this third premix to the mixed phase emulsion the organic (oleaginous) phases are combined and remain separate from the discrete aqueous phase in the form of a water-in-oil emulsion. As an alternate to adding the wax as a solution, melted wax can be added directly to the first premix with heating and mixing, thereby eliminating the need for petroleum distillate.

EXAMPLE 1

A water base ammoniated paint remover formulation was prepared according to Procedure A with the following ingredients on a % by weight basis. Approximately 0.1 g/gallon Blue A oil soluble dye was added to color the formulation.

| INGREDIENT | % BY WT. |
|---|---|
| BENZYL ALCOHOL | 40.00 |
| AROMATIC HYDROCARBON SOLVENT | 4.40 |
| HYDROXYPROPYL CELLULOSE | 0.45 |
| BENZOTRIAZOLE | 2.00 |
| PARAFFIN WAX | 0.20 |
| AMMONIUM HYDROXIDE (30%) | 4.00 |
| WATER, DISTILLED | 47.95 |
| TOTAL BY WEIGHT | 100.00 |

Portions of the paint remover were used in standard performance tests on painted metal panels and found to be fully satisfactory for paint stripping activity and aluminum corrosion. Depending on ambient conditions and batch size the wax-containing water-in-oil emulsion had 85 to 95% reduced water evaporation during the same time in comparison with a control which did not contain an evaporation retardant. In qualitative terms only one gram of water evaporated from an invention sample while approximately ten grams had evaporated from a control water-in-oil emulsion.

EXAMPLE 2

A water based ammoniated paint remover formulation was prepared according to Procedure A with the following ingredients on a % by weight basis. Approximately 0.1 g/gallon Blue A oil soluble dye was added to color the formulation.

| INGREDIENT | % BY WT. |
|---|---|
| BENZYL ALCOHOL | 31.20 |
| AROMATIC HYDROCARBON SOLVENT | 6.80 |
| HYDROXYPROPYL CELLULOSE | 0.25 |
| 2-MERCAPOBENZOTHIAZOLE | 0.25 |
| OLEIC HYDROXYETHYL IMIDAZOLINE | 0.70 |
| SODIUM SILICATE | 0.30 |
| PARAFFIN WAX | 0.20 |
| AMMONIUM HYDROXIDE (30%) | 10.00 |
| WATER, DISTILLED | 50.30 |
| TOTAL BY WEIGHT | 100.00 |

Test samples gave comparative stripping rates and reduced rates of water evaporation as with the water based ammoniated samples of Example 1.

EXAMPLE 3

A water based acid paint remover formulation with a benzyl formate equilibrium mixture was prepared according to Procedure B with the following ingredients on a % by weight basis. Approximately 0.1 g/gallon green dye was added to color the formulation.

| INGREDIENT | % BY WT. |
|---|---|
| BENZYL ALCOHOL | 25.00 |
| FORMIC ACID (90%) | 12.00 |
| AROMATIC HYDROCARBON SOLVENT | 3.85 |
| 2-MERCAPTOBENZOTHIAZOLE | 0.80 |
| OLEIC HYDROXYETHYL IMIDAZOLINE | 0.70 |
| SODIUM HYDROXIDE (50%) | 0.30 |
| HYDROXYPROPYL CELLULOSE | 0.20 |
| PARAFFIN WAX | 0.15 |
| WATER | 57.00 |
| TOTAL BY WEIGHT | 100.00 |

In comparison with Examples 1 and 2 this formulation (in which benzyl formate is produced in situ in the stabilized water-in-oil emulsion) showed superior stripping action for both epoxy and polyurethane. Stripping action will decrease to about one third when the water addition is eliminated and only about 4.5% by weight water is present as a result of the esterification reaction between benzyl alcohol and formic acid to produce benzyl formate in situ.

EXAMPLE 4

Formulations were prepared as in Examples 1 to 2 except that the final ammonia content was varied from 1.12% to 5.35%. Satisfactory paint removal or paint stripping was obtained for all samples tested within this range.

EXAMPLE 5

Example 1 was repeated except that the final ammonia level was controlled to be 3.0% by weight and 3.0% monoethanolamine was added. Stripping action was fully satisfactory.

EXAMPLE 6

A water based acid paint remover formulation with a benzyl formate equilibrium mixture was prepared similar to Procedure B with the following ingredients on a % by weight basis.

| INGREDIENT | % BY WT. |
| --- | --- |
| BENZYL ALCOHOL | 18.0 |
| FORMIC ACID (90%) | 13.0 |
| SODIUM XYLENE SULFONATE | 11.0 |
| 2-MERCAPTOBENZOTHIAZOLE | 0.5 |
| MINERAL OIL | 10.0 |
| WATER | 47.5 |
|  | 100.0 |

The ingredients are shown above as added, but at equilibrium it was determined that 9.3% of the composition was benzyl formate and benzyl alcohol and formic acid had been reduced by the esterification reaction to 10.6% and 9.9% respectively.

Use of mineral oil in place of paraffin wax as an evaporation retardant provided similar protection against loss of water and formic acid from the formulation. No decrease in stripping action was observed in comparison with a control which did not contain mineral oil or paraffin wax or other evaporation retardant.

What is claimed is:

1. An alkaline paint stripper formulation with a retarded rate of water evaporation from the water phase, said formulation comprising a water-in-oil emulsion having (a) a water phase comprising water and ammonia and (b) a continuous benzyl alcohol phase comprising benzyl alcohol and a natural or synthetic wax, the wax being slightly in excess of that which would saturate the benzyl alcohol phase.

2. A paint stripper formulation as in claim 1 wherein the wax is paraffin wax.

3. An alkaline paint stripper formulation with a retarded rate of water evaporation from the water phase, said formulation comprising a water-in-oil emulsion having (a) a water phase comprising water and ammonia and (b) a continuous benzyl alcohol phase comprising benzyl alcohol and an evaporation retardant, the evaporation retardant being selected from the group consisting of paraffin wax, ceresine wax, mineral oil, paraffin oil, montan wax, vegetable wax, microcrystalline wax, behenic acid, polyacrylate and vinyl chloride acrylic ester copolymers.

4. A method of stripping paint which comprises contacting said paint with the paint stripping formulation of claim 3.

* * * * *